United States Patent [19]

Ziegler

[11] Patent Number: 4,562,401
[45] Date of Patent: * Dec. 31, 1985

[54] CIRCUIT ARRANGEMENT AND METHOD FOR FAULT LOCATING IN CONJUNCTION WITH EQUIPMENT FOR THE TRUNK FEEDING OF ELECTRICAL LOADS

[75] Inventor: Alfred Ziegler, Munich, Fed. Rep. of Germany

[73] Assignee: Siemens Aktiengesellschaft, Berlin and Munich, Fed. Rep. of Germany

[ * ] Notice: The portion of the term of this patent subsequent to Mar. 26, 2002 has been disclaimed.

[21] Appl. No.: 546,123

[22] Filed: Oct. 27, 1983

[30] Foreign Application Priority Data

Nov. 12, 1982 [DE] Fed. Rep. of Germany ....... 3242000

[51] Int. Cl.[4] ........................................... H01H 35/00
[52] U.S. Cl. ..................................... 324/52; 340/652; 307/112
[58] Field of Search ....................... 340/652, 753, 754; 324/51, 52; 307/326, 327, 112, 127, 131

[56] References Cited

U.S. PATENT DOCUMENTS 4,055,733 10/1977 Holsinger .
4,250,501 2/1981 Pokrandt ............................. 340/652
4,507,568 3/1985 Ziegler ................................. 307/112

FOREIGN PATENT DOCUMENTS 1154525 9/1963 Fed. Rep. of Germany .
1155172 10/1963 Fed. Rep. of Germany .
1157663 11/1963 Fed. Rep. of Germany .
2620348 6/1977 Fed. Rep. of Germany .
0139399 10/1979 Japan ................................... 340/652
1286033 8/1972 United Kingdom .

OTHER PUBLICATIONS

Heg: "Drive Circuits for LED Scales with Linear & Logarithmic Response"-Elektron. Int. (Austria)-No. 11, 1980; pp. 350-357.

Primary Examiner—Stanley T. Krawczewicz
Assistant Examiner—Jose M. Solis
Attorney, Agent, or Firm—Karl F. Milde, Jr.

[57] ABSTRACT

Circuit arrangement for fault locating in conjunction with equipment for the trunk feeding of electrical loads by means of dc series feeding in which the trunk supply circuit is equipped with cross branches conducting only for currents in the direction of a test current. In such a circuit arrangement it is possible to indicate the results of the fault locating in a simple manner. Towards this end, one window discriminator for each load is provided in the supply point. This circuit arrangement can be used advantageously in communications equipment having trunk fed waystations.

7 Claims, 1 Drawing Figure

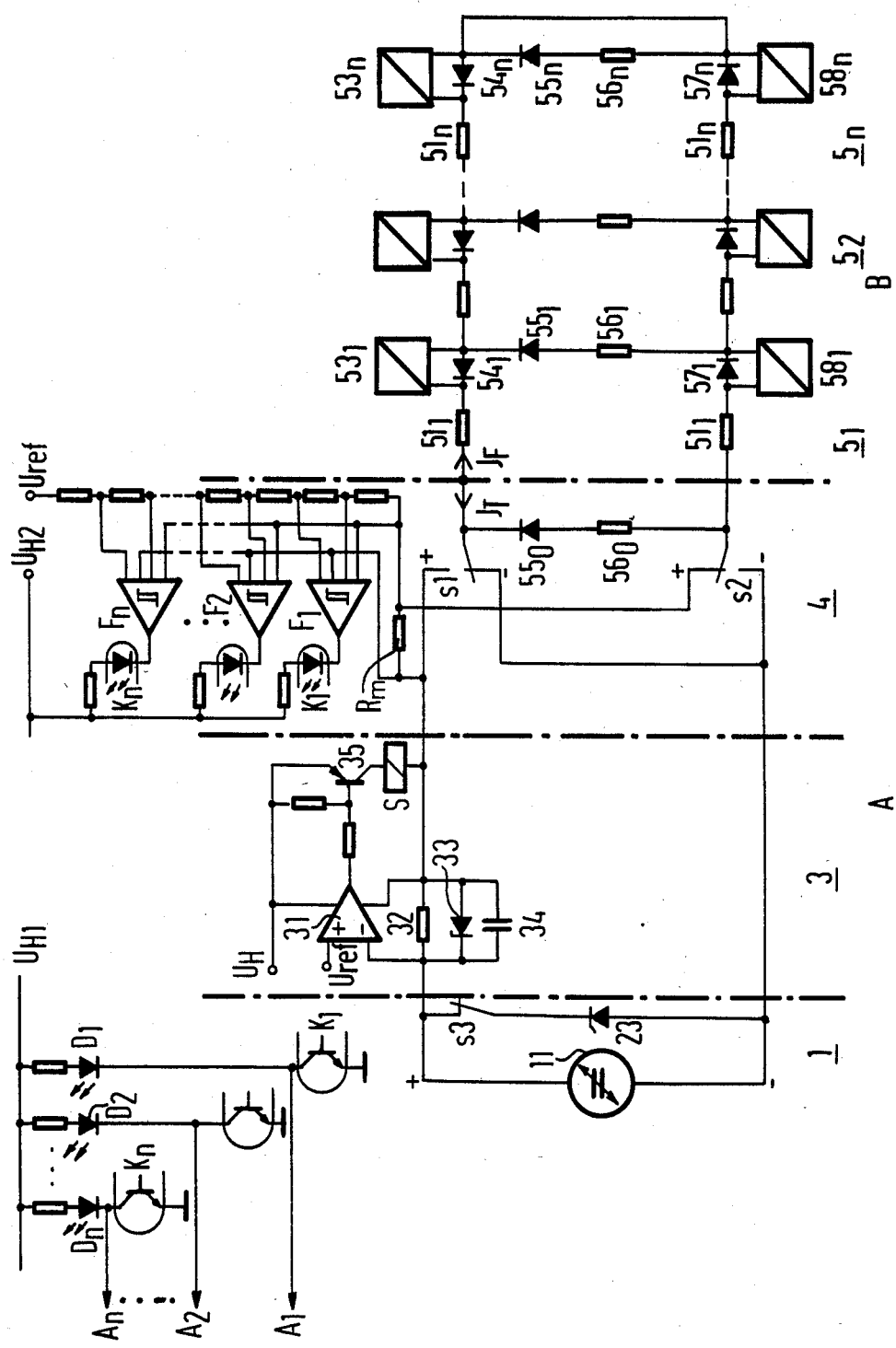

CIRCUIT ARRANGEMENT AND METHOD FOR FAULT LOCATING IN CONJUNCTION WITH EQUIPMENT FOR THE TRUNK FEEDING OF ELECTRICAL LOADS

BACKGROUND OF THE INVENTION

The invention relates to a circuit arrangement for the location of faults, which operates in conjunction with equipment for trunk feeding of electrical loads.

German patent DE-AS No. 1 157 663 discloses a circuit arrangement in which a resistance is connected in series with a diode whose poles are inverse to the supply voltage between the trunk supply current paths at each waystation. In case of a fault, the input resistance of the remaining line section is measured at the supply point with a harmless voltage of, for example 60 V which is polarized inverse to the trunk supply voltage. Conclusions as to the location of the interrupted field can be drawn from the current. However, instead of test resistors, German patent DE-AS No. 2 620 348 discloses that constant current diodes may be provided in the waystations.

The diodes in parallel to the loads may be formed by one or more series-connected diode paths or by Z-diodes; and if applicable, these diodes serve to limit or stabilize the load voltage. When the loads are not adequately protected against supply voltages of the wrong polarity by the parallel-connected diodes, diodes connected in series to the loads may be installed additionally. The polarity of these additional diodes is the forward direction of the trunk supply current. Such an arrangement is described in German patent DE-AS No. 1 157 663.

British patent application Ser. No. 1,286,033 discloses the use of switching ancillaries for the trunk supply of electrical load equipment for the automatic closing of the trunk supply loop ahead of a point of interruption. These devices close the trunk supply loop across a cross branch as long as no current of a given magnitude is measured in the continuing part of the trunk supply loop. In this manner one section of the trunk supply line after another is tested and, if faults are not detected, put on line when the installation is put into operation. This makes it easy to avoid putting the installation into operation if there is a resistance approaching or even exceeding a given resistance value corresponding to the human body resistance at a point of interruption.

German patent application DE-AS No. 1 154 525 describes another embodiment of equipment to close a trunk supply loop ahead of a point of interruption.

On the other hand, equipment for the trunk supply of electrical loads can be constructed by means of dc series feeding without such switching ancillaries, when there is only limited mounting space. When putting such trunk supply lines into service the trunk supply equipment at the supply point must lock the trunk supply current onto the loop resistance of the entire line. However, for safety reasons such a lock-on must not occur when the trunk supply circuit is closed at a point of interruption due to contact via human body resistance.

As long as the trunk supply current is so low that it does not exceed a value permissible in the case of human contact (for example 40 mA), the lock-on can proceed without additional measures.

However, at high trunk supply currents it is expedient to check before the start-up whether the supply loop is completely closed rather than bridged due to contact at a point of interruption. This entails the problem that the loop resistance of a complete trunk supply line, particularly at low test voltages or currents, is by far greater than the human body resistance which can be assumed to equal 2000 Ohms. Consequently, difficulties may result when testing the entire trunk supply loop, because a good loop cannot be distinguished with sufficient certainty from one bridged at a point of interruption by human body resistance. It is particularly disadvantageous that in view of the desired test, the trunk supply range and the specific resistance of the trunk supply current paths are limited.

A method for starting up the trunk supply of electric loads which ensures a safe, in particular automatic, start-up of a trunk supply line without equipment for the automatic closing of the trunk supply loop ahead of a point of interruption regardless of the load resistance, involves the following steps.

One resistance of the trunk supply is tested first and the trunk supply current is turned on only after the trunk supply loop resistance has been found at the supply point to be below a specified value. The trunk supply loop resistance testing is conducted with the current flowing during the test having the opposite direction with regard to the trunk supply current.

In one embodiment of a circuit arrangement proposed for the implementation of this method there is provided at the supply point an instrument for measuring the trunk supply current and the test current.

SUMMARY OF THE INVENTION

It is an object of the invention to design a circuit arrangement for a fault location system in which the fault locating result can be easily evaluated. In particular, the result should be indicated in a clear and simple manner and/or be transmittable by means of conventional trunk monitoring equipment.

In general, the invention features, in one aspect, a circuit arrangement for fault location in conjunction with equipment for a trunk supplying electrical loads by means of dc series feeding, by means of supply equipment provided at the supply point containing a dc current source, there being disposed, parallel to the trunk supply current loads and the trunk supply loop (B) designed to be free of devices for automatically closing the trunk supply loop ahead of a point of interruption and fed unilaterally, diodes ($53_1$, $58_1$ ... $53_n$, $58_n$; $54_1$, $57_1$ ... $54_n$, $57_n$) whose polarity is in the blocking direction, and the fault location being carried out so that the current flowing in a test circuit is oppositely directed relative to the trunk supply current ($I_F$), and cross branches being conductive only for currents of the test current direction in a series connection comprised of an ohmic resistance ($56_1$ ... $56_n$) and a diode ($55_1$ ... $55_n$) whose polarity blocks the trunk supply current, wherein the supply equipment being switchable from a constant current source to a constant voltage source and connected to the supply point via a precision resistor series-connected in the test circuit to a voltage source, is a group window discriminators, in which one window discriminator is coordinated with each load, and another cross branch which only conducts currents in the test direction is provided at the supply equipment output.

In preferred embodiments of the circuit arrangement an indicator element is connected to each of the window discriminators; a precision resistor is located in a current branch which carries current only when a test voltage is applied to the trunk supply loop; an optocoupler is located between the window discriminator and an indicating element; the optocoupler outputs are unipolarly connected to a reference potential and operating states of the window discriminators are picked up directly by a trunk monitor which transmits the status of the window discriminators, in the form of single bit messages, to a central device; the supply point further includes a relay controllable by the current flowing through the trunk supply circuit for connecting the trunk supply line in currentless state to the constant voltage source; and the supply point includes, in a current branch which is carrying a current when the trunk supply current source is connected to the trunk supply circuit, its own measuring device for measuring and indicating the trunk supply current.

In general, the invention features, in another aspect, a method for taking the trunk supply system into operation safety in which the system includes a current arrangement for fault location in conjunction with equipment for a trunk supplying electrical loads by means of dc series feeding, by means of supply equipment provided at a supply point and containing a dc current source, there being disposed, parallel to the trunk supply current loads in the trunk supply loop (B) designed to be free of devices for automatically closing the trunk supply loop ahead of a point of interruption and fed unilaterally, diodes ($53_1, 58_1 \ldots 53_n, 58_n; 54_1, 57_1 \ldots 54_n, 57_n$) whose polarity is in the blocking direction, and the fault location being carried out so that the current flowing in a test circuit is oppositely directed relative to the trunk supply current ($I_F$), and cross branches being conducted only for currents of the test current direction in a series connection comprised of an ohmic resistance ($56_1 \ldots 56_n$) and a diode ($55_1 \ldots 55_n$) whose polarity blocks the trunk supply current, wherein the supply equipment is switchable from a constant current source to a constant voltage source and connected to the supply point via a precision resistor series-connected in the test circuit to a voltage group, is a group of window discriminators, and wherein one window discriminator is coordinated with each load, and another cross branch which only conducts currents in the test direction that is provided at the supply equipment output, including the steps of first testing one resistance for the supply loop and turning on the trunk supply current only when the trunk supply loop resistance is found at the supply point to be below a specified value.

In the event of a fault, the discriminator respectively assigned to the defective field of the trunk supply circuit responds, so that the resultant fault locating is particularly easy to adapt to different applications and puts out the fault location clearly, with the possibility of providing an indicating element for each trunk supply section.

Use of the circuit arrangement in connection with a method for taking the trunk supply line into operation safely is of particular advangtage. In this method one resistance of the trunk supply loop is tested first and the trunk supply current is turned on only when a trunk supply loop resistance value below a specified amount is found at the supply point. In this case, the means required at the supply point to feed a test current into the trunk supply circuit can be utilized repeatedly.

Such a method, in conjunction with the cross branches serving to locate faults, can also be applied advantageously to trunk supply loops whose resistance is already in the range of human body resistance during the test because, in fault location, the conductance of the parallel precision resistors reduces the input resistance of the trunk supply loop further. It is then advantageous to select test resistances in the cross branches which are as low as permitted by the measuring accuracy of the fault location, to obtain the least possible supply loop input resistance. This makes it possible, even in cases where the copper resistance by itself approximates the magnitude of human body resistance, to obtain an adequate difference between line input resistance and body resistance.

This line testing before start-up and the fault locating occur in nearly the same manner, especially when the same test voltage is used. This circumstance also makes automation of the testing and locating procedure possible at low cost.

Other features and advantages of the present invention will become apparent from the following detailed description, and from the claims.

For a full understanding of the present invention, reference should now be made to the following detailed description and to the accompanying drawing.

DETAILED DESCRIPTION

The invention will now be described in detail with reference to the single FIGURE.

The FIGURE shows a circuit arrangement for the automatic, safe start-up of a trunk supply line without switching ancillaries, which includes automatic fault locating through conductance measurement in the event of a line interruption.

The trunk supply loop B serves the trunk supply of repeaters of a four-wire communications line not shown in the FIGURE. The trunk supply loop is supplied from one side only and therefore shows a direct connection of the two conductors or trunk supply current paths at the end opposite the supply point.

Looped in each trunk supply current path are the supply voltage inputs of the auto-converters $53_1 \ldots 53_n$ or $58_1 \ldots 58_n$, respectively, of the boosters associated with one transmission direction. The auto-converters are fed via a separate trunk supply line or, for instance, via the respective cable center conductor in conjunction with trunk supply separating filters. There may possibly be only one single load per waystation. The cable resistances of the supply sections or repeater fields are marked $51_1 \ldots 51_n$. The loads are bridged by diodes $54_1 \ldots 54_n$ and $57_1 \ldots 57_n$, respectively. These diodes have their polarity arranged so they are blocked for the trunk supply current.

As viewed from the supply point A there is at the end of each supply section or after each waystation containing the loads, a cross branch consisting of an ohmic resistance $56_1 \ldots 56_n$ and of a diode $55_1 \ldots 55_n$ connected in series thereto. At the end opposite the supply point A the trunk supply loop is terminated.

For the trunk supply current, the diodes $55_1 \ldots 55_n$ have polarities in the reverse direction. The resistors $56_1 \ldots 56_n$ in the cross branches serve to locate faults through conductance measuring.

The supply point A contains supply equipment 1 with constant current source 11. Parallel to current source 11 is a current branch which includes break contact S3 of Relay S and Z-diode (zener diode) 23. If the output voltage of current source 11 exceeds the Zener voltage of Z-diode 23 with the relay S not energized, then the output voltage of supply equipment 1 is limited to, for example, 60 V. This can also be accomplished by other conventional voltage limiting circuits.

Connected in series with current source 11 in the main circuit is resistor 32. Threshold switch 31, which compares the voltage drop at resistor 32 with the reference voltage $U_{ref}$, is connected to resistor 32 which serves as a current measuring resistor. When the test current $I_T$ exceeds a specified value, the relay S becomes energized via transistor 35.

Threshold switch 31 is protected against excess voltages by a parallel connection comprised of Z-diode 33 and capacitor 34. Capacitor 34 prevents the threshold switch from responding when the line is affected by interference pulses.

Relay S also has two double-throw contacts s1 and s2 which are connected to one each of the two trunk supply current paths. When relay S is not energized, the change-over switch S1 is connected to the negative pole of current source 11 and the change-over switch S2 is connected to the positive pole of current source 11 via measuring device 4 and resistor 32. When relay S is energized, the double-throw contact s1 is connected to the positive pole of current source 11 via resistor 32, and the double-throw contact s2 is connected to the negative pole of current source 11.

Connected in series with resistor 32 is the precision resistor $R_M$ in the branch of the double-throw contact s1 located in the test circuit.

The window discriminators $F_1 \ldots F_n$ are connected to the precision resistor $R_M$ and are supplied, moreover, with reference voltages generated by means of a voltage divider located between the precision resistor $R_M$ and the reference voltage $U_{ref}$. In relation to the resistors $56_1 \ldots 56_n$ provided in the cross branches of the trunk supply loop, this voltage divider is designed so that one window discriminator each is coordinated with one repeater field.

Each window discriminator $F_1 \ldots F_n$ is followed by its own optocoupler. On their output side the emitters of the optocouplers $K_1 \ldots K_n$ carry reference potential and the collectors carry the auxiliary voltage $U_{H1}$ via an LED. The transistor path contained in the output side of the optocouplers $K_1 \ldots K_n$ serve at the same time as message transmitters to a monitoring device which may be connected to the leads $A_1 \ldots A_n$.

Provided in the output circuit of the supply equipment is a relay S with double-throw contacts which, in the currentless condition, connect the line with reversed polarization and reduce the output voltage of the supply equipment to a low value in a conventional manner. When putting the equipment in service, the line input current (with inverse polarization) is measured with this voltage. If a line fault does not exist, the current resulting at the test voltage $U_p$, dropping at Z-diode 23, is determined primarily by the copper resistance of the trunk supply loop, if the section is intact. It will then exceed a critical value, and the line will be connected with correct polarization due to the energization of the relay S, and the limitation of the supply voltage to the low test value is cancelled. The full output of the supply equipment then goes to the line.

In the event of a line interruption the output current drops below a critical value, the supply voltage is reduced to the low test value via the switching relay and the line is connected to the test voltage with reversed polarity.

If necessary or desired, the function of the switching relay S can be replaced by a semiconductor circuit having the same effect.

In case of a line interruption the magnitude of the test current is determined solely by the number of cross branches $56_1 \ldots 56_n$. At a test voltage $U_P$ equal to, for example 40 V, and with cross branch resistors $R_Q$ which are, for example 100 kOhm each, the test current would be, in first approximation, n times 1 mA, depending on the number of the remaining fields. The automatic indication of the defective field is achieved in that a number of LEDs $D_1 \ldots D_n$ equalling the number of repeater fields is provided. In case of a fault, only the diode associated with the defective field lights up, thus indicating the repeater field number in which the interruption site is located.

With the total test current flowing through the remaining cross branches in case of a line interruption increasing with the length of the remaining line, the voltage drop U originating at the precision resistor $R_M$ also has the same characteristic. Thus, $$U \approx n \times \frac{U_p}{R_Q} \times R_M$$

where n is the number of the interrupted repeater field.

So that the first repeater field, when interrupted, carries the test voltage $$1 \times \frac{U_p}{R_Q} \times R_M$$

a precision resistor $56_0$ with diode $55_0$ is likewise provided in the output circuit of the trunk supply equipment A.

By connecting the voltage at the precision resistor $R_M$ at the same time to the inputs of window discriminators $F_1 \ldots F_n$ set to different sensitivities, only the window discriminator associated with each interrupted field is forward controlled. An associated LED $D_1 \ldots D_n$ is turned on via the optocouplers $K_1 \ldots K_n$ which serve the high-voltage-proof potential separation between output circuit and signal field. By means of a ground contact, a signal message for each interrupted field may also be transmitted in this way. These messages could be forwarded in coded form through a trunk monitor.

If the line has no faults, the voltage drop U at the precision resistor $R_M$ is above the highest value which would be measurable in case of an interruption so that no discriminator responds. After switching to normal trunk supply operation no current flows through the precision resistor $R_M$. Therefore, no discriminator responds either, because the voltage drop at the precision resistor $R_M$ would have to be at least $$1 \times \frac{U_p}{R_Q} \times R_M$$

There has thus been shown and described a novel circuit arrangement and method for fault locating in conjunction with equipment for the trunk feeding of electrical loads which fulfills all the object and advantages sought. Many changes, modifications, variations and other uses and application of the subject invention will, however, become apparent to those skilled in the art after considering this specification which discloses embodiments thereof. All such changes, modifications, variations and other uses and applications which do not depart from the spirit and scope of the invention are deemed to be covered by the invention which is limited only by the claims which follow.

I claim:

1. In a circuit arrangement for fault location in equipment for a trunk supply loop (B) that supplies electrical loads ($53_1 \ldots 53_n$; $58_1 \ldots 58_n$) by means of dc series feeding, said circuit arrangement including supply equipment provided at a supply point which is switchable from a constant current source for feeding said trunk supply loop to a constant voltage source for feeding a test circuit connected to said supply point via a resistor, said resistor being series-connected in said test circuit to a voltage source so that the current flowing in said test circuit ($J_T$) is oppositely directed relative to the trunk supply current ($J_F$), said trunk supply loop being free of devices for automatically closing the trunk supply loop ahead of a point of interruption and being fed unilaterally, there being disposed in said trunk supply loop, (1) diodes ($54_1 \ldots 54_n$; $57_1 \ldots 57_n$), connected parallel to said electrical loads, whose polarity is in the blocking direction for the trunk supply current, and (2) cross branches connected across said trunk supply loop, each comprising a series connection of an ohmic resistance ($56_1 \ldots 56_n$) and a diode ($55_1 \ldots 55_n$) whose polarity is in the blocking direction for the trunk supply current, the improvement comprising (1) additional cross branch, connected across said supply point at said supply equipment output and containing a diode which conducts current only in the test direction, and (2) a plurality of window discriminators connected across said supply point, there being one window discriminator per cross branch.

2. The circuit arrangement according to claim 1, wherein an indicating element is connected to each of said window discriminators.

3. The circuit arrangement according to claim 1, wherein said precision resistor is located in a current branch which carries current only when a test voltage is applied to said trunk supply loop.

4. The circuit arrangement according to claim 1, further comprising an optocoupler located between said window discriminator and an indicating element.

5. The circuit arrangement according to claim 4, wherein said optocoupler outputs are unipolarly connected to a reference potential and operating states of said window discriminators can be picked up directly by a trunk monitor which transmits the status of said window discriminators, in the form of single bit messages, to a central device.

6. The circuit arrangement according to claim 1, wherein said supply point further comprises a relay controllable by said current flowing through said trunk supply circuit for connecting said trunk supply line in currentless state to said constant voltage source.

7. The circuit arrangement according to claim 1, wherein said supply point comprises, in a current branch which is carrying a current when said trunk supply current source is connected to said trunk supply circuit, its own measuring device for measuring and indicating said trunk supply current.

* * * * *